US008621575B2

(12) United States Patent
Wiseman et al.

(10) Patent No.: US 8,621,575 B2
(45) Date of Patent: Dec. 31, 2013

(54) SECURE WEB BASED TRANSACTIONS (75) Inventors: Nick Wiseman, Sunbury-on-Thames (GB); Paul Reeves, Sunbury-on-Thames (GB); Kumar Duwari, Sunbury-on-Thames (GB); Colin Franks, Sunbury-on-Thames (GB); George Launchbury, Sunbury-on-Thames (GB); Jayne Lee, Tunbridge Wells (GB); Jude Thorne, Tunbridge Wells (GB); Jacek Stawicki, Lodz (PL)

(73) Assignee: Ice Organisation Ltd (GB)

( * ) Notice: Subject to any disclaimer, the term of this patent is extended or adjusted under 35 U.S.C. 154(b) by 249 days.

(21) Appl. No.: 12/990,213

(22) PCT Filed: Apr. 24, 2009

(86) PCT No.: PCT/GB2009/050421
§ 371 (c)(1),
(2), (4) Date: Oct. 28, 2010

(87) PCT Pub. No.: WO2009/133386
PCT Pub. Date: Nov. 5, 2009

(65) Prior Publication Data
US 2011/0061095 A1 Mar. 10, 2011

(30) Foreign Application Priority Data

Apr. 28, 2008 (GB) .................................. 0807678.8

(51) Int. Cl.
*G06F 7/04* (2006.01)
*G06F 15/16* (2006.01)
*G06F 17/30* (2006.01)
*H04L 29/06* (2006.01)
*G06F 12/14* (2006.01)
*G11C 7/00* (2006.01)
*G06Q 20/00* (2012.01)

(52) U.S. Cl.
USPC .............. 726/4; 726/5; 726/6; 726/21; 705/67

(58) Field of Classification Search
USPC ............................................................ 726/4
See application file for complete search history.

(56) References Cited

U.S. PATENT DOCUMENTS 5,903,721 A * 5/1999 Sixtus ................................ 726/2
6,029,141 A   2/2000 Bezos et al.
(Continued)

FOREIGN PATENT DOCUMENTS

AU   2003236579   1/2004
AU   2008100433   6/2008
(Continued)

OTHER PUBLICATIONS

MasterCard SecureCode: How it Works: secure online transactions & payments. http://www.mastercard.com/us/personal/en/cardholderservices/securecode/how_it_works.. downloaded Jul. 21, 2009.
(Continued)

*Primary Examiner* — Carolyn B Kosowski
(74) *Attorney, Agent, or Firm* — Cooley LLP (57) ABSTRACT

Methods of securely performing online transactions are described which involve two independently controlled web servers. In order to complete a transaction, a user interacts concurrently with each of the two web servers and authentication may occur between the user and each web server and between web servers. Each of the two web servers provide data which is used to complete the transaction and the data provided by the first web server is communicated directly to the second web server for use in the transaction. In an embodiment, the first web server provides a web page which enables a user to specify a variable which is used in the transaction. This is communicated to the second web server which processes the transaction along with an identifier for the message. The identifier may be used in validating the variable before it is used in processing the transaction. Following completion of a transaction this may be reported in real time to the first web server.

16 Claims, 10 Drawing Sheets

(56) References Cited

U.S. PATENT DOCUMENTS

| | | | |
|---|---|---|---|
| 6,986,040 B1 * | 1/2006 | Kramer et al. | 713/155 |
| 7,216,236 B2 * | 5/2007 | Kou et al. | 713/183 |
| 7,343,322 B1 | 3/2008 | Mulderry et al. | |
| 7,849,324 B1 * | 12/2010 | Dharmarajan et al. | 713/185 |
| 7,877,794 B2 * | 1/2011 | Fujiwara et al. | 726/10 |
| 7,983,993 B2 * | 7/2011 | Graves et al. | 705/67 |
| 8,108,903 B2 * | 1/2012 | Norefors et al. | 726/2 |
| 8,136,148 B1 * | 3/2012 | Chayanam et al. | 726/5 |
| 8,161,532 B2 * | 4/2012 | Sebesta et al. | 726/5 |
| 8,220,030 B2 * | 7/2012 | Singhal | 726/2 |
| 2001/0021925 A1 | 9/2001 | Kazunori | |
| 2002/0178122 A1 * | 11/2002 | Maes | 705/64 |
| 2003/0172304 A1 * | 9/2003 | Henry et al. | 713/201 |
| 2004/0148372 A1 * | 7/2004 | Campbell | 709/223 |
| 2004/0236962 A1 * | 11/2004 | Wong et al. | 713/201 |
| 2005/0144452 A1 | 6/2005 | Lynch et al. | |
| 2005/0216421 A1 * | 9/2005 | Barry et al. | 705/64 |
| 2005/0283609 A1 * | 12/2005 | Langford | 713/176 |
| 2006/0230064 A1 | 10/2006 | Perkowski | |
| 2007/0006286 A1 * | 1/2007 | Singhal | 726/4 |
| 2007/0288377 A1 * | 12/2007 | Shaked | 705/44 |
| 2008/0027874 A1 | 1/2008 | Monseignat et al. | |
| 2009/0070859 A1 * | 3/2009 | Mathur et al. | 726/5 |
| 2011/0302627 A1 * | 12/2011 | Blom et al. | 726/2 |

FOREIGN PATENT DOCUMENTS

| | | |
|---|---|---|
| EP | A1237108 | 9/2002 |
| TW | 591454 B | 12/2000 |
| WO | WO9840809 | 9/1998 |
| WO | WO0150391 | 7/2001 |
| WO | WO0159731 | 8/2001 |
| WO | WO2004006143 | 1/2004 |
| WO | WO2007148234 | 12/2007 |

OTHER PUBLICATIONS

VISA How it works. Verified by Visa is easy to use and gives you complete confidence when shopping online. http://www.visaeurope.com/en/cardholders/verified_by_visa/ downloaded Feb. 23, 2011.

The Ice Organisation Ltd. PCT/GB2009/050421 filed Apr. 24, 2009 entitled "Secure Web-Based Transactions." International Search Report & Written Opinion (Nov. 2, 2010).

The Ice Organisation Ltd., GB0807678.8. Search Report (Jul. 22, 2009).

\* cited by examiner

SECURE WEB BASED TRANSACTIONS

CROSS REFERENCE TO RELATED APPLICATIONS

This application claims the benefit of International Patent Application No. PCT/GB2009/050421 with an international filing date of Apr. 24, 2009, the contents of each are incorporated herein by reference.

BACKGROUND

Large numbers of web based transactions are performed every day; however parties to these transactions have concerns about the security of the transactions which are performed over the internet. The security problems may relate to the possibility of interception of messages and the identification of the parties involved.

Typically a web based transaction involves interaction with a single web server controlled by the retailer, although in some instances the payment is handled by a third party and the consumer is redirected to a payment provider's website in order to pay for the items they have purchased. As financial information is being transmitted, security is clearly a very significant worry for users.

Some online retailers enable consumers to redeem vouchers or otherwise access specific transactors in a transaction. Typically a consumer is sent a voucher or voucher code by post or email and the consumer then enters a code into a box at checkout on the retailer's website. Such systems are open to abuse as they are not carried out securely. For example, such systems are susceptible to interception of communication of the voucher details to the consumer by a third party.

The embodiments described below are not limited to implementations which solve any or all of the disadvantages of known methods and systems for enabling web based transactions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods of securely performing online transactions are described which involve two independently controlled web servers. In order to complete a transaction, a user interacts concurrently with each of the two web servers and authentication may occur between the user and each web server and between web servers. Each of the two web servers provide data which is used to complete the transaction and the data provided by the first web server is communicated directly to the second web server for use in the transaction. In an embodiment, the first web server provides a web page which enables a user to specify a variable which is used in the transaction. This is communicated to the second web server which processes the transaction along with identifiers for the message. The identifier(s) may be used in validating the variable before it is used in processing the transaction. Following completion of a transaction this may be reported in real time to the first web server.

A first aspect provides a method of performing an online transaction comprising: within a single web session: performing authentication of a user at a first web server; providing a first web page to the user, the first web page comprising a link to a second web page provided by the second web server; and establishing a first communication link between the first web server and the second web server for secure transmission of user data prior to completion of a transaction between the user and one of the first and second web servers; and the method further comprising: establishing a second communication link between the first web server and the second web server following completion of the transaction, for secure transmission of transaction data between the web servers.

The step of establishing a second communication link may be performed in real time immediately following completion of the transaction.

The method may further comprise, enabling the user to concurrently and independently interact with each of the first and second web servers via a web page provided by the first web server and a web page provided by the second web server.

The web pages provided by the first and the second web servers may be provided within two separate frames of a browser.

The web page provided by the second web server may be the second web page.

The method may further comprise, performing authentication of the user at the second web server.

The user data may comprise a user input variable and wherein the method may further comprise: receiving a user input at the first web server, the user input identifying a user input variable entered by the user.

The method may further comprise, at the first web server: receiving a request for the user input variable from the second web server via the first communication link; and transmitting a response message comprising the user input variable to the second web server via the first communication link.

The method may further comprise, at the first web server: verifying the request prior the transmitting the response.

The method may further comprise, at the first web server: pushing a message comprising the user input variable to the second web server.

Secure transmission of user data over the first communication link may use window to window data transfer and the window to window data transfer may be encrypted.

The method may further comprise, passing an identifier associated with the user from the first web server to the second web server on activation of said link.

A second aspect provides a method of performing an online transaction comprising: at a first web server and within a single web session: performing authentication of a user; providing a first web page to the user, the first web page comprising a link to a second web page provided by the second web server; and establishing a first communication link between the first web server and the second web server for secure transmission of user data prior to completion of a transaction between the user and one or both of the first and second web servers; and the method further comprising, at the first web server: establishing a second communication link between the first web server and the second web server following completion of the transaction, for secure transmission of transaction data between the web servers.

The step of establishing a second communication link may be performed in real time following completion of the transaction.

A third aspect provides a system for secure web based transactions comprising a first web server and a second web server, wherein at least one of the first and the second web servers is arranged to: perform authentication of a user; providing a first web page to the user, the first web page comprising a link to a second web page provided by the second web server; establish a first communication link between the first web server and the second web server for secure transmission of user data prior to completion of a transaction between the user and one of the first and second web servers; and establish a second communication link between the first web server and the second web server following completion of the transaction, for secure transmission of transaction data between the web servers.

Said at least one of the first and the second web servers may be arranged to establish the second communication link in real time immediately following completion of the transaction.

A fourth aspect provides a method of operating a system comprising a first and a second web server substantially as described with reference to any of FIGS. 2 and 4-9 of the drawings.

A fifth aspect provides a web server substantially as described with reference to FIG. 10 of the drawings.

A sixth aspect provides a computer program comprising computer program code means adapted to perform all the steps of any of the methods described herein when said program is run on a computer. The computer program may be embodied on a computer readable medium.

The methods described herein may be performed by firmware or software in machine readable form on a storage medium. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
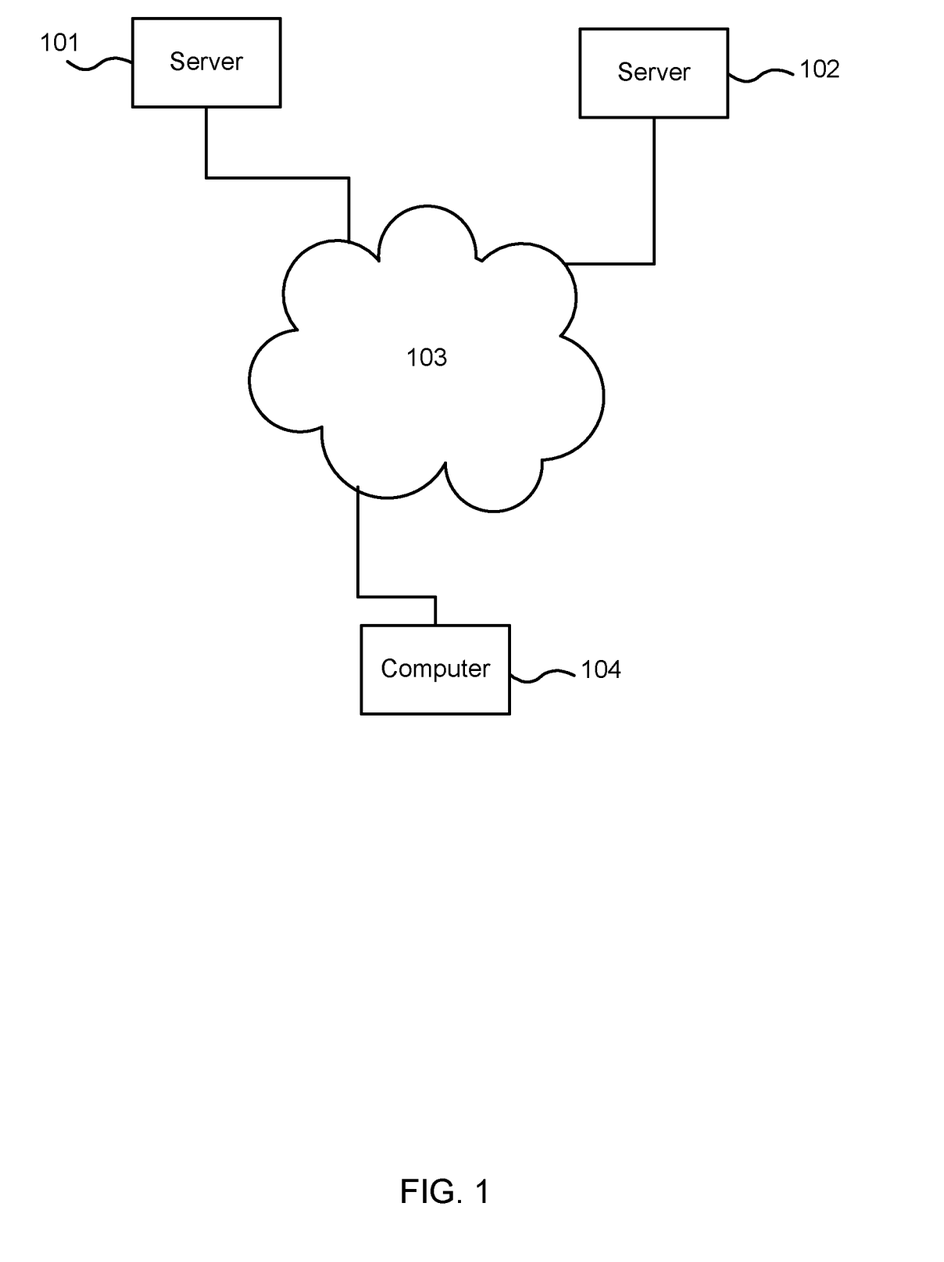
FIG. 1 is a schematic diagram of a system which enables secure web based transactions.

FIG. 1 is a schematic diagram of a system which enables secure web based transactions. The system comprises two web servers 101, 102 which are connected via a network 103, such as the internet. A user can interact with the two web servers via a browser running on a computer 104 or other user device. The two web servers 101, 102 are independently controlled, i.e. they are operated by (or for) different entities.

Figure 2:
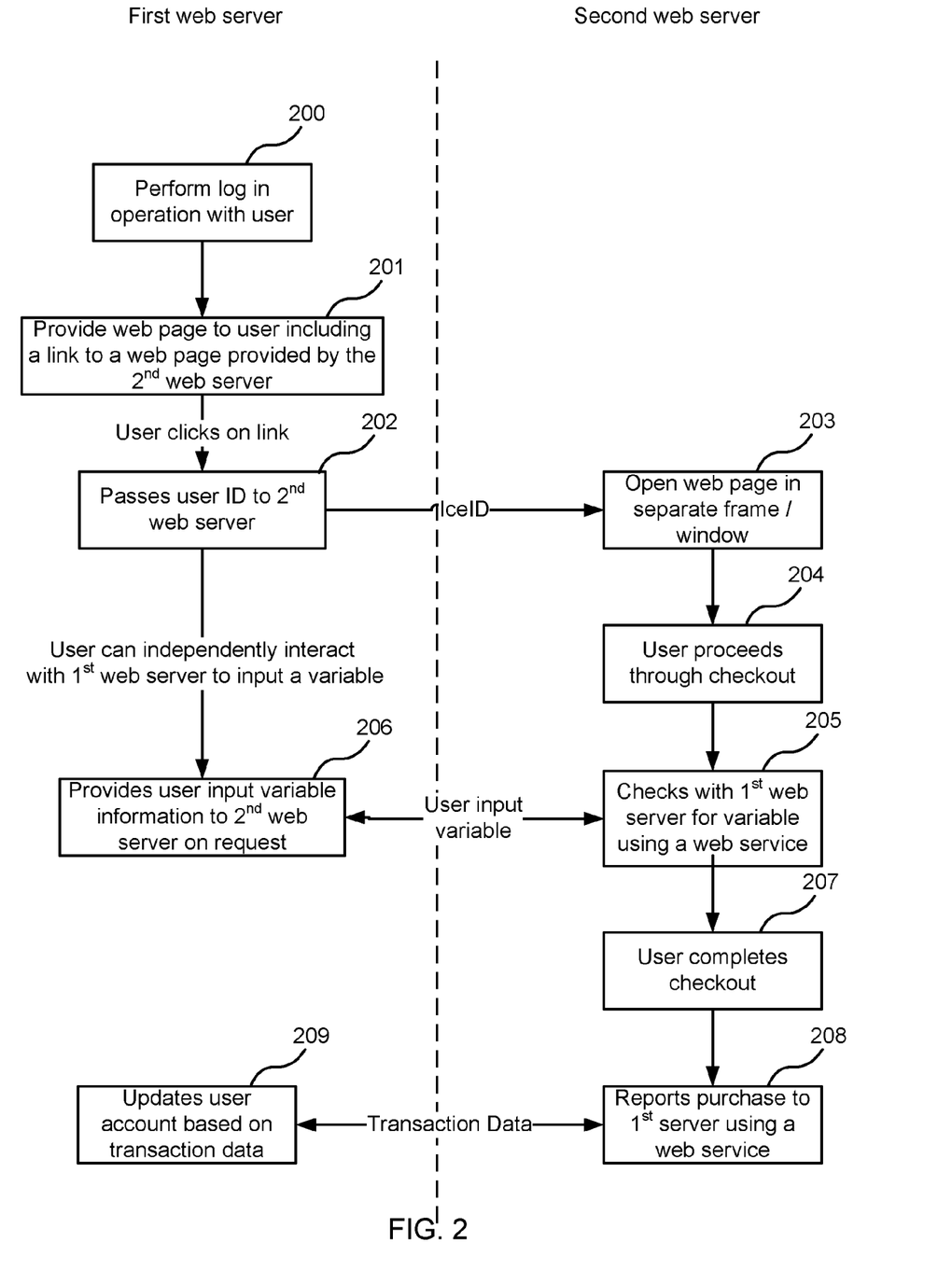
FIG. 2 is a flow diagram of an example method of operation of the system of FIG. 1.

FIG. 2 is a flow diagram of an example method of operation of the system of FIG. 1. A first web server 101 provides a web page to a browser which includes a link to a web page provided by the second server 102 (block 201). This web page may be provided after a user has logged in or otherwise performed authentication with the first web server (block 200) or alternatively authentication may occur after the web page has been provided (e.g. before block 202). When the user clicks on the link via their browser, the first server passes an identifier to the second server (block 202) and the second server launches the web page (block 203). At the same time, the first server may update the web page provided by the first server or my launch a new web page. The identifier passed from the first server to the second server identifies the user and/or the second server (i.e. the target recipient of the identifier). This system may be referred to as a system ID, which is also referred to as the IceID herein. In an example, the IceID may be a combination of a user identifier (user ID) and an identifier for the second server (or the operator of the second server, e.g. a vendor ID). In such an example, where a user is transacting with more than one vendor, the IceID communicated to a first vendor will be different to the IceID communicated to a second vendor. The system ID may alternatively be a session ID. The identifier for the second server (which may be a vendor ID) may have previously been provided to the second web server (or its controlling entity) by the first web server (or its controlling entity).

Figure 3:
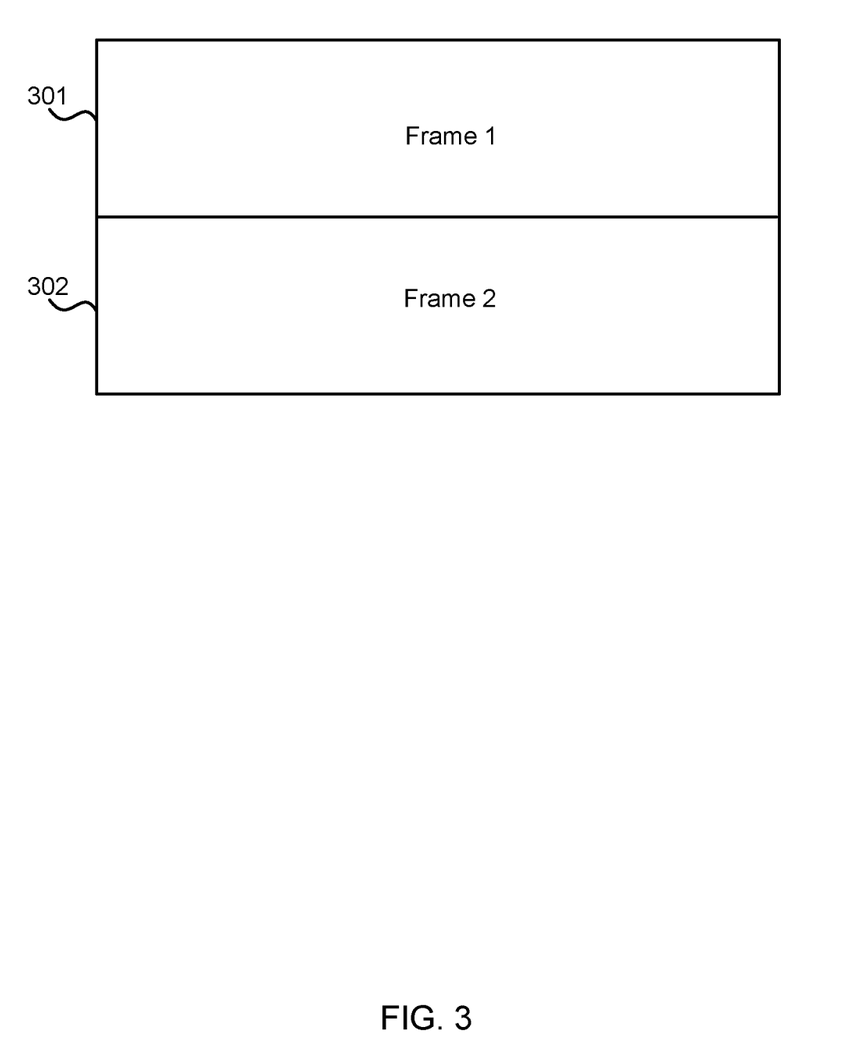
FIG. 3 shows a schematic diagram of a graphical user interface of a browser.

The second web page may be launched (in block 203) within a separate window in the browser or within a second frame within the same window as a web page provided by the first web server, e.g. as shown in FIG. 3. The web page provided by the first web server may be the first web page (provided in block 201) or another web page provided by the first web server. The referral to the web page provided by the second web server may use an HTTP GET (or HTTPS GET) comprising a query string parameter containing the IceID in the URL of the request. Having launched the second web page, the user can then independently interact with each of the web pages, e.g. a user may interact with the second web page (launched by the second web server) to select a product to purchase and a user may interact with the web page provided by the first web server to enter a variable (e.g. a free-form variable) which may subsequently be used in completing the transaction (as described below). This variable may represent a discount, a value of a reward to be redeemed, a customization in relation to the product or transaction, or any other parameter.

At any time, the second server 102 may request data from the first server relating to the user interaction with the first server (block 205) and this data may be requested more than once.

In the example shown in FIG. 2, the data is requested after the user initiates a transaction (block 204) with the second server 102 (via the web page provided by the second server and displayed using the browser). The request (in block 205) may be in the form of a SOAP (simple object access protocol)

request to a web service running on the first web server. Other techniques and protocols may be used to provide the request such as HTTP or HTTPS without SOAP, FTP, TCP/IP. SOAP requests are used in the following description by way of example only and it will be appreciated that all references to a SOAP request may be replaced by a reference to an alternative form of request. The SOAP request may comprise the IceID (as provided in block 202) or an identifier for the second web server.

In response to the request (made in block 205), the web service running on the first web server provides the data relating to the user interaction to the second web server (block 206). The data provided in the request (e.g. the identifier for the second web server) may be verified prior to providing the response. In an example, the first web server may check that the second web server is at the expected IP address. The response provided by the first web server 101 (in block 206) may comprise the IceID, a response identifier (responseID), and a value of the user input variable. In some examples, additional parameters may be provided, such as an expiry date for the response. The transport used for the SOAP request and response may be HTTP (Hypertext Transfer Protocol) or HTTPS (HTTP over Secure Socket Layer).

The user may perform authentication with the second web server at any point during the transaction process (e.g. in block 204 or 207). By requiring independent authentication with each of the two web servers, the security of the web based transaction system is increased by reducing the possibility of spoofing the user.

On receipt of the response (sent in block 206) or at any point up to the completion of the transaction, the second web server verifies the data received. In the example shown in FIG. 2, this verification occurs immediately before completion of the transaction (in block 207).

The verification may comprise one or more of:
  checking that the server certificate (received from the first web server) is valid;
  checking that the information provided in the response (e.g. the user input variable or the responseID) has not been used in more than one transaction and this may be performed by storing those responseIDs which have been used in a transaction; and
  checking that the response relates to a request sent within a defined period of time (e.g. within the last 24 hours);
  checking that any expiry date in the response (where provided) is valid (i.e. that the expiry date is not less than the current date and time).

If any of the validation steps fails, then the transaction may be aborted or the data provided by the first web server may not be used in the transaction and the transaction may proceed based on data provided solely to the second web server by the user. The validation process increases the security of the web based transaction system by preventing spoofing of the first web server and/or responses.

Where the second web server requests data from the first server more than once (i.e. blocks 205 and 206 are repeated), the second web server discards all but the most recently received responseIDs and corresponding values of the user input variable.

As soon as possible after the completion of the transaction, the second web server 102 sends a confirmation to the first web server 101 (block 208) and the first web server updates a database comprising information about the user based on this confirmation (block 209). This confirmation may be provided in the form of a SOAP request over https to a second web service running on the first web server. It will be appreciated that the first and second web server running on the first web server may be combined into a single web service; however the operations performed remain logically distinct. The confirmation may comprise the IceID (which comprises the user ID and the ID of the second web server), a transaction ID and the responseID (as provided in block 206) where the user input variable is used in processing the transaction. The confirmation may also comprise additional details about the actual transaction (e.g. the value, the items purchased, the date and time of the transaction etc).

On receipt of the confirmation (in block 209) and prior to updating the user account, the first server may check that the second web server is at the expected IP address or otherwise perform authentication of the confirmation message and/or the second web server. This increases the security of the web based transaction system by preventing spoofing of the second web server and/or confirmation messages.

Providing the confirmation (in block 208) in real time, rather than at some later time following the transaction, increases the security of the transaction because the database of user details, stored at the first web server, is kept up-to-date.

Although the above description refers to the confirmation being sent (in block 208) in real time following the transaction (e.g. blocks 200-208 or 200-209 may be performed within a single web session), in other examples, the confirmation may be processed in a batch and sent later. In such an example, part of the process may be performed within a single session (e.g. blocks 200-207) and the remaining blocks may be performed subsequently.

FIG. 3 shows a schematic diagram of a graphical user interface (GUI) of a browser which comprises two frames 301, 302 and each frame may contain a web page provided by a different web server and these web servers may be independently controlled. In an example, the first frame 301 may contain a web page provided by the first web server 101 and the second frame 302 may contain a web page provided by the second web server 102 (as opened in block 203). As described above, the web page provided by the second web server may alternatively be displayed within a second window of the users browser.

FIGS. 4-9 are flow diagrams of further example methods of operation of the system of FIG. 1 and these are described in more detail below. It will be appreciated that aspects of any of the methods may be combined with aspects from one or more of the other methods to create yet further examples. For the purposes of explanation, these methods describe the confirmation being sent in real time following the completion of the transaction; however, as described above, the confirmation may alternatively be sent later (e.g. where confirmation messages are sent in batches).

Figure 4:
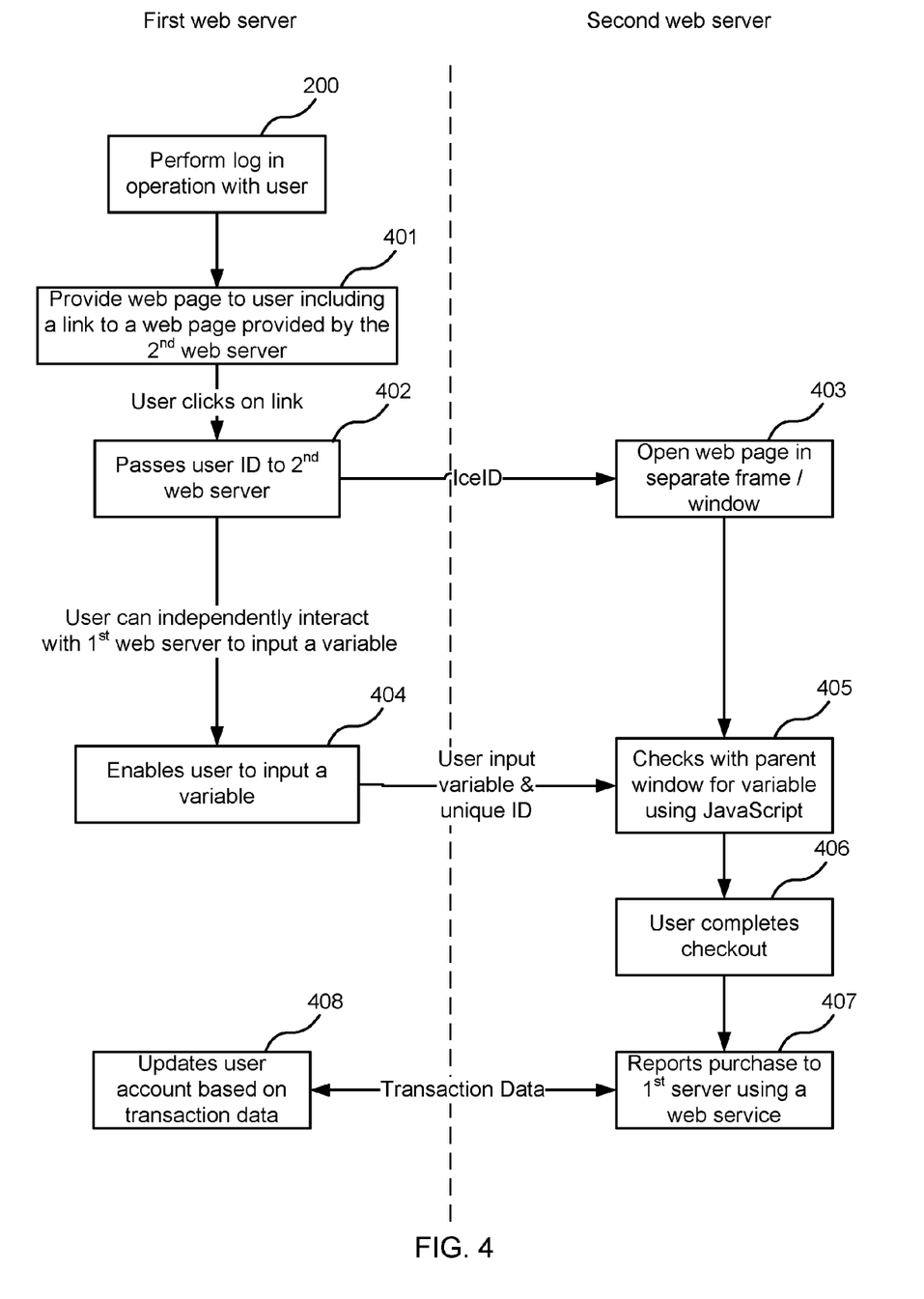
FIGS. 4-9 are flow diagrams of further example methods of operation of the system of FIG. 1.

In the example shown in FIG. 4, the first web server 101 provides a web page to a browser which includes a link to a web page provided by the second server 102 (block 401). As described above, this web page may be provided after a user has logged in or otherwise performed authentication with the first web server (block 200) or alternatively authentication may occur after the web page has been provided (e.g. before block 402). When a user clicks on this via their browser, the first server passes the IceID to the second server (block 402) and the second server launches the web page (block 403). As described above, the second web page may be launched within a frame or a separate window and the referral to the web page provided by the second web server may use an HTTP GET or HTTPS GET comprising a query string parameter containing the IceID in the URL of the request. Having launched the second web page, the user can independently interact with each of the web pages and the web page provided by the first server (which may be the first web page or another web page) may enable a user to enter (or otherwise select) a variable, which may be a free-form variable (block 404).

When the second web page is loaded, or at any time up to and during the processing of the transaction (which may be referred to as checkout), the second web page runs JavaScript which looks for the presence of a user input variable and a unique identifier in the parent (i.e. the frame provided by the first web server) frame (block 405). The JavaScript may be run more than once and on identification of a user input variable with a different value, the previously determined value is discarded.

As soon as possible after the completion of the transaction (block 406), the second web server 102 sends a confirmation to the first web server 101 (block 407) and the first web server updates a database comprise information about the user based on this confirmation (block 408). This confirmation may be provided in the form of a SOAP request over HTTPS to a second web service running on the first web server. The confirmation may comprise the IceID (or the user ID and the ID of the second web server separately), a transaction ID and details of the user input variable used in processing the transaction. As described above, the confirmation may also comprise additional details about the actual transaction (e.g. the value, the items purchased, the date and time of the transaction etc) and verification may be performed before updating the user account.

In order to increase the security of the method shown in FIG. 4, the user input variable may be encoded using a private key associated with the first web server and the second web server may use a corresponding public key to decrypt the encrypted key.

Figure 5:
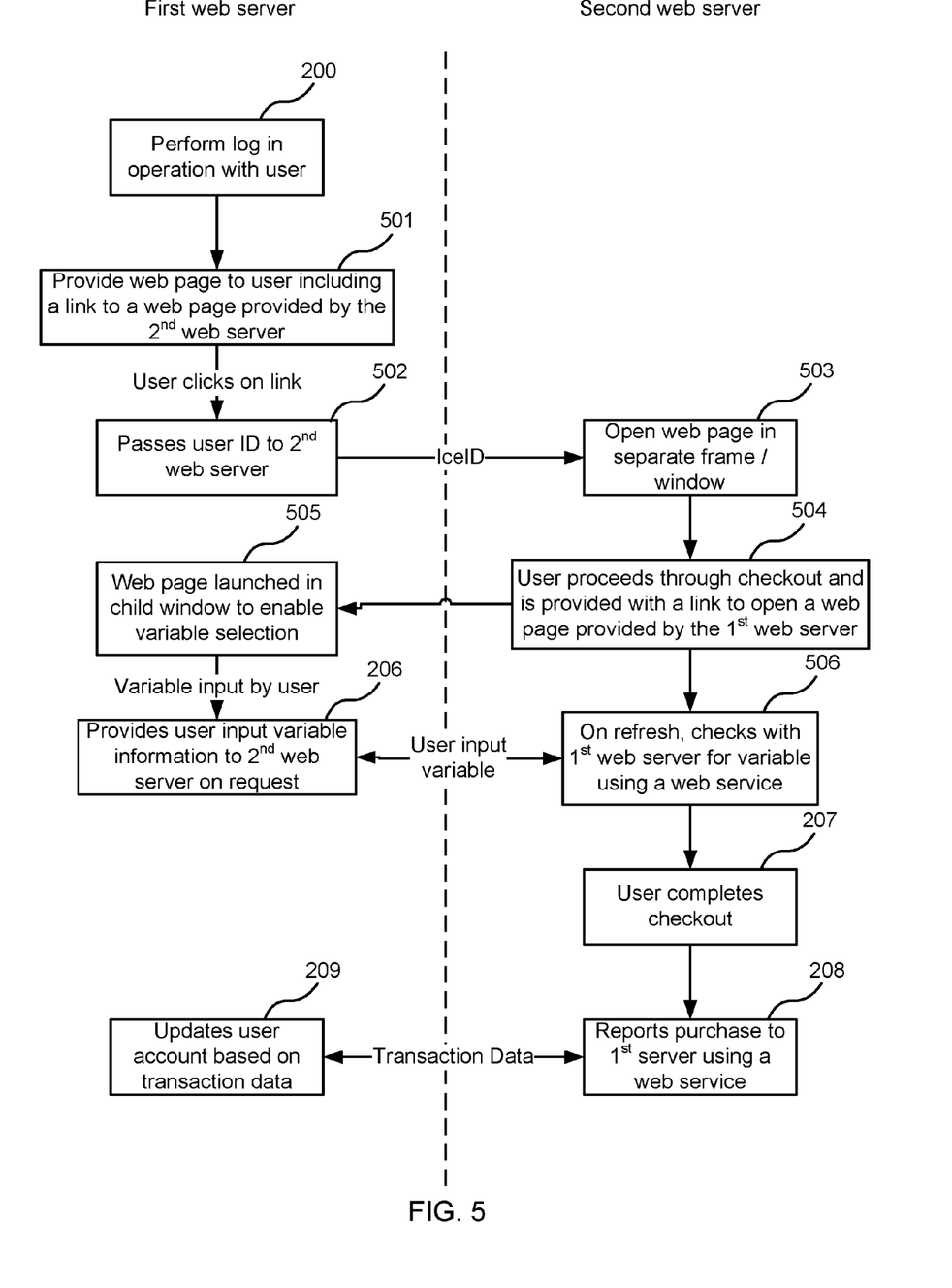

FIG. 5 is a flow diagram of another example method of operation of the system of FIG. 1 which starts in a similar manner to the methods shown in FIGS. 2 and 4. The first web server 101 provides a web page to a browser which includes a link to a web page provided by the second server 102 (block 501) and when a user clicks on this via their browser, the first server passes the IceID to the second server (block 502) and the second server launches the web page (block 503). This web page provided by the second web server may be launched to replace the first web page (i.e. in the same window) or may be launched in a separate a separate window or frame. At this point the web page provided by the first web server may also be updated. The referral to the web page provided by the second web server may use an HTTP GET comprising a query string parameter containing the IceID in the URL of the request.

The web page provided by the second web server (and launched in block 503) may comprise a link to a web page provided by the first web server or alternatively such a link may be provided in another web page provided by the second web server, such as a web page for completing a transaction (e.g. a checkout page). When a user clicks on this link (block 504), on which ever page it may occur, a child window or frame is opened which contains a web page provided by the first web server (block 505). Since the user logged in to the first web server originally (in block 200) then the child window or frame still has access to the session information, such as the IceID. Having launched the child window, the user can independently interact with each of the web pages and the web page in the child window (launched in block 505) may enable a user to enter (or otherwise select) a variable (e.g. a free-form variable).

At any time, the second server 102 may request data from the first server relating to the user interaction with the first server via the child window (block 506) and this data may be requested more than once. In the example shown in FIG. 5, the data is requested when the web page provided by the second web server is refreshed and this may be triggered by a link or button on the web page which the user is prompted to press (e.g. 'Refresh to apply discount'). As described above, the request (in block 506) may be in the form of a SOAP request to a web service running on the first web server and the request may comprise the IceID (which comprises the user ID and an identifier for the second web server). The method then proceeds as described above (blocks 206-209).

Figure 6:
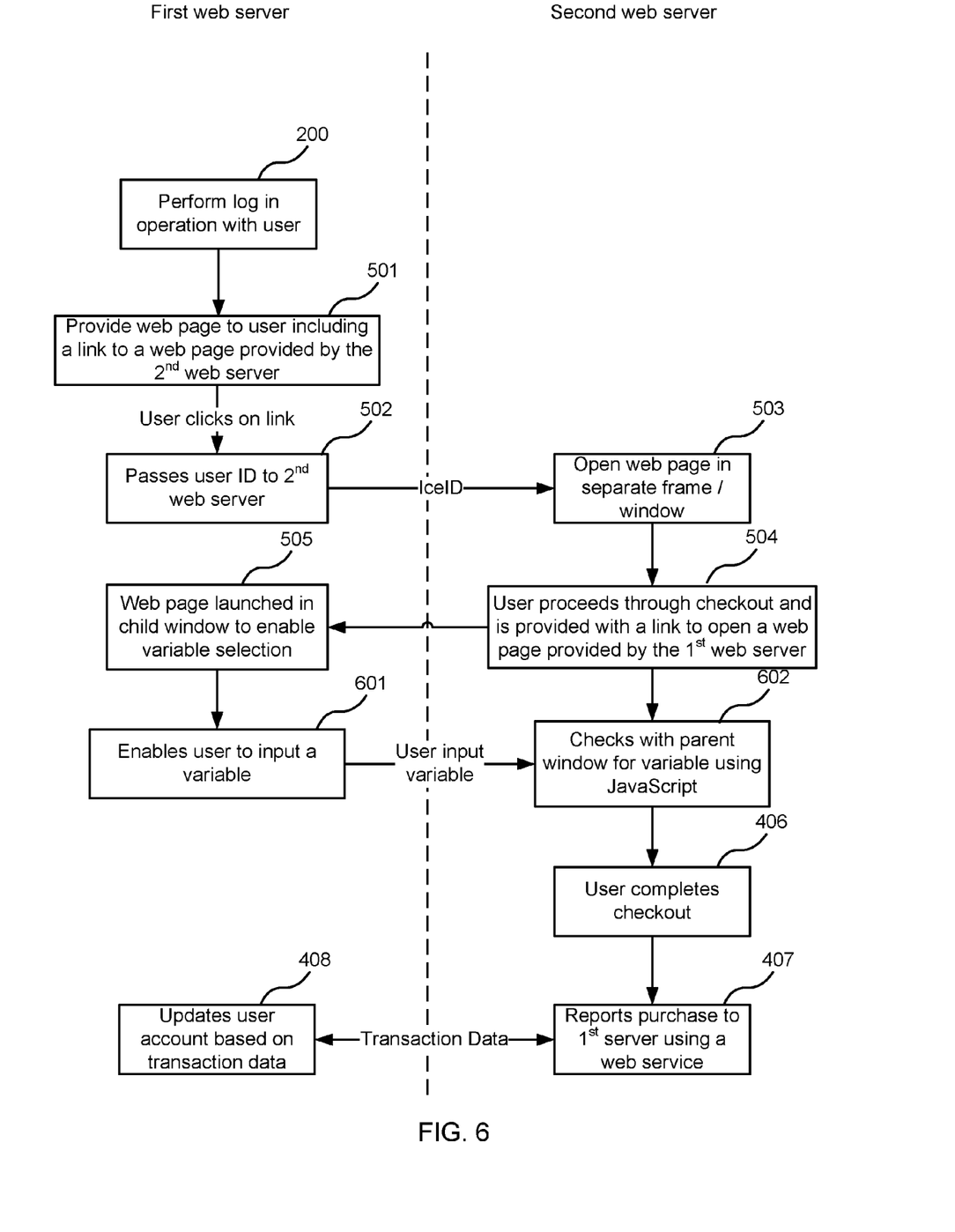

FIG. 6 shows another example method which combines aspects shown in FIGS. 4 and 5 above. The method starts as described above with reference to FIG. 5 (blocks 200 and 501-505) and the web page launched in the child window (or frame) enables a user to enter (or otherwise select) a free-form variable (block 601). When the web page provided by the second web site (in the parent window) is refreshed, or at any time up to and during the processing of the transaction, the second web page runs JavaScript which looks for the presence of a user input variable and a unique identifier in the child window (block 602). As described above with reference to FIG. 4, the JavaScript may be run more than once and on identification of a user input variable with a different value, the previously determined value is discarded. As described above, the user input variable may be encoded using a private key associated with the first web server and the second web server may use a corresponding public key to decrypt the encrypted key. As soon as possible after the completion of the transaction (block 406), the second web server 102 sends a confirmation to the first web server 101 (block 407) and the first web server updates a database comprising information about the user based on this confirmation (block 408), as described above.

Figure 7:
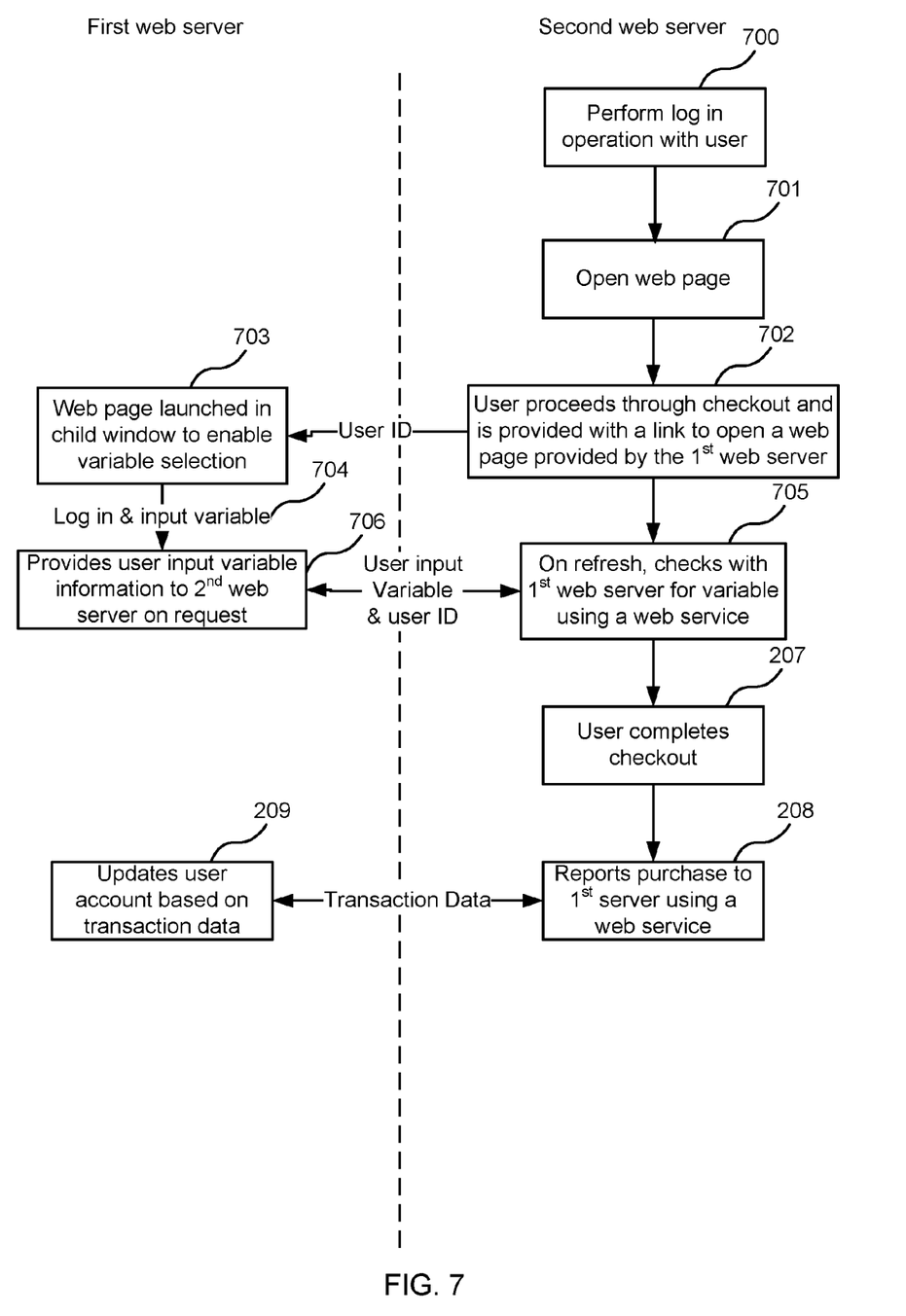

In the example method shown in FIG. 7, a web page is provided to a browser by the second web server 102 (block 701). This web page provided by the second web server may comprise a link to a web page provided by the first web server or alternatively such a link may be provided in another web page provided by the second web server, such as a web page for completing a transaction (e.g. a checkout page). This web page may be provided after a user has logged in or otherwise performed authentication with the second web server (block 700) or alternatively authentication may occur after the web page has been provided (e.g. before or in block 702). When a user clicks on this link (block 702), on which ever page it may occur, a child window or frame is opened which contains a web page provided by the first web server (block 703). An identifier is passed from the second web server to the first web server which may comprise a user identifier (userID), the IceID, an identifier for the second web server, a session ID or other identifier. Having launched the child window or frame, the user can independently interact with each of the web pages and the web page in the child window or frame (launched in block 703) may enable a user to enter (or otherwise select) a variable (e.g. a free-form variable). The user may be required to log in to or register with the first web server (block 704).

At any time, the second server 102 may request data from the first server relating to the user interaction with the first server via the child window (block 705) and this data may be requested more than once. In the example shown in FIG. 7, the data is requested when the web page provided by the second web server is refreshed and this may be triggered by a link or button on the web page which the user is prompted to press (e.g. 'Refresh to apply discount'). As described above, the request (in block 705) may be in the form of a SOAP request to a web service running on the first web server and the request may comprise the identifier that was passed from the second web server to the first web server when the child window or frame was opened (e.g. the userID in the example shown in FIG. 7).

In response to the request (made in block 705), the web service running on the first web server provides the data relating to the user interaction to the second web server (block 706). The data provided in the request (e.g. the identifier for the second web server) may be verified prior to providing the response. The response provided by the first web server 101 (in block 706) may comprise the user ID, a responseID and a value of the user input variable. As described above, the response may include additional parameters, such as an expiry date. The transport used for the SOAP request and response may be HTTP or HTTPS. The method then proceeds as described above (blocks 207-209).

Figure 8:
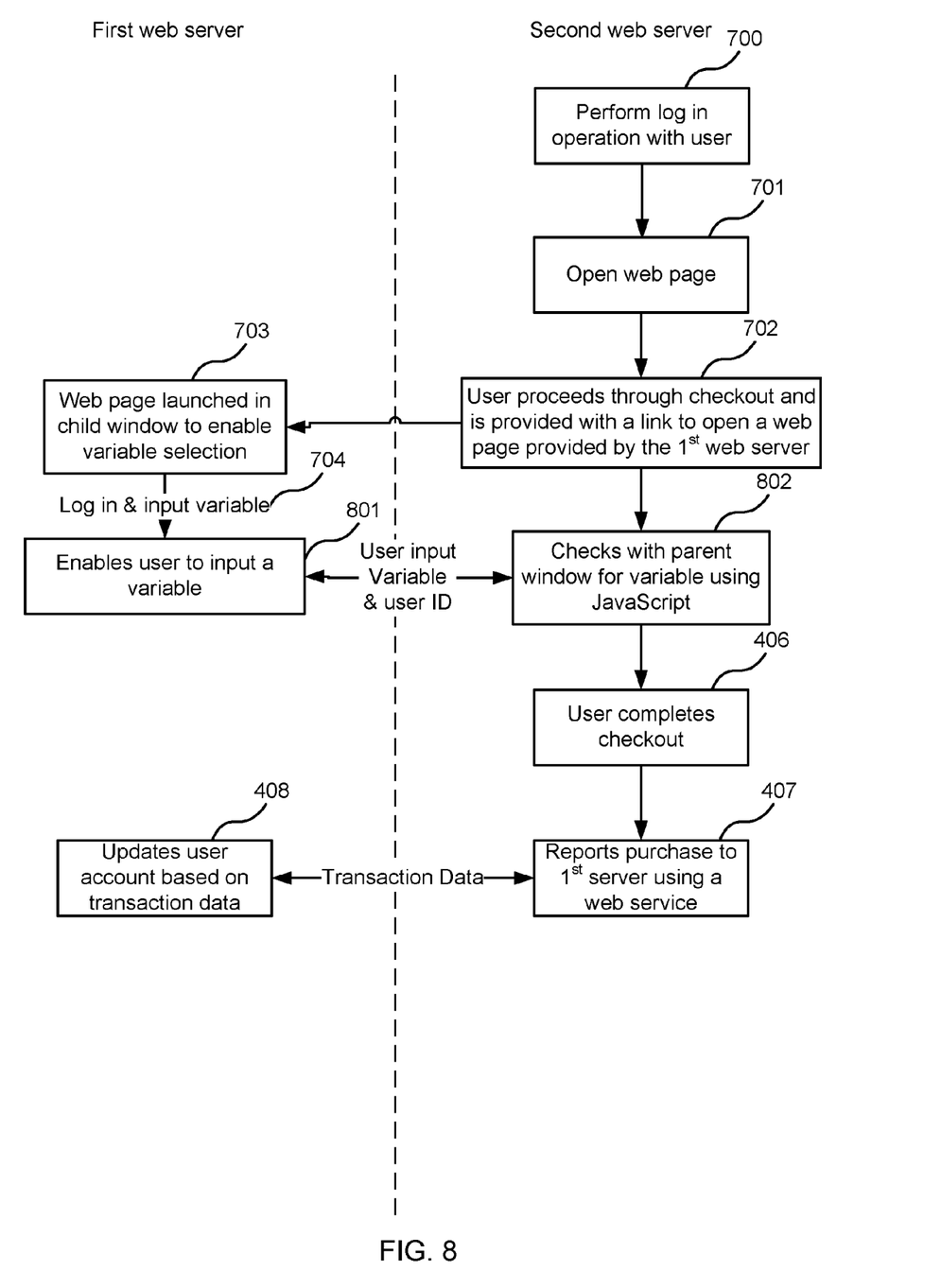

FIG. 8 shows a variation of the methods shown in FIGS. 4-7 and described above in which JavaScript is used to share the user input variable and the user ID (blocks 801-802). The method starts as described above with reference to FIG. 7 (blocks 700-704) and the web page launched in the child window (or frame) enables a user to enter (or otherwise select) a variable (block 801). When the web page provided by the second web site (in the parent window/frame) is refreshed, or at any time up to and during the processing of the transaction (which may be referred to as checkout), the second web page runs JavaScript which looks for the presence of a user input variable in the child window and also obtains the user ID (block 802). As described above, the JavaScript may be run more than once and on identification of a user input variable with a different value, the previously determined value is discarded. The user input variable and the user ID may be encoded using a private key associated with the first web server and the second web server may use a corresponding public key to decrypt the encrypted key. As soon as possible after the completion of the transaction (block 406), the second web server 102 sends a confirmation to the first web server 101 (block 407) and the first web server updates a database comprise information about the user based on this confirmation (block 408), as described above.

Figure 9:
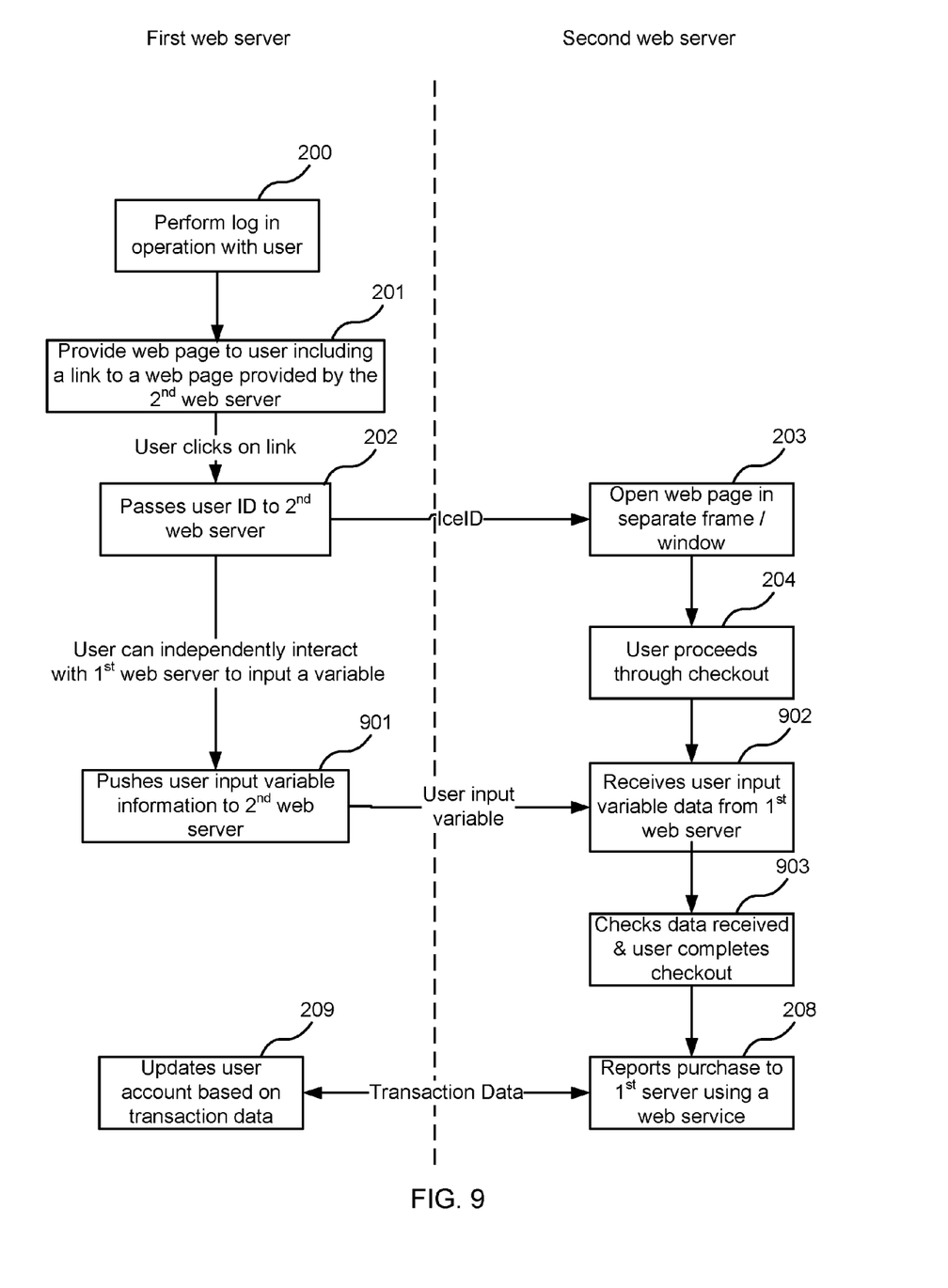

The method shown in FIG. 9 is similar to that shown in FIG. 2, except that the first web server pushes the user input variable to the second web server instead of the second web server pulling the data. The method starts as shown in FIG. 2 (blocks 200-204) and described above. At any time, the first web server 101 may push the user input variable data to the second web server by calling a web service running on the second web server (block 901). The data may be pushed in the form of a SOAP request to the web service running on the second web server and the SOAP request may comprise the IceID (as previously provided in block 202), a responseID and a value of the user input variable. The request may also comprise an expiry date for the response, which may be defined in terms of a date and/or a time and https may be used. Alternatively, the responseID may be deemed to expire within a defined period (e.g. 24 hours) and subsequent verification may confirm that the request was received within this period (e.g. within the last 24 hours).

On receipt of the response (block 902) or at any point up to the completion of the transaction (e.g. in block 903), the second web server verifies the data received and this may be performed as described above. During the transaction process and prior to completion of the transaction, the second web server checks that the web service has been called (in block 903).

Where the second web server receives data from the first server more than once (i.e. blocks 901 and 902 are repeated), the second web server discards all but the most recently received responseID and value of the user input variable.

As soon as possible after the completion of the transaction, the second web server 102 sends a confirmation to the first web server 101 (block 208) and the first web server updates a database comprising information about the user based on this confirmation (block 209), as described in more detail above.

Figure 10:
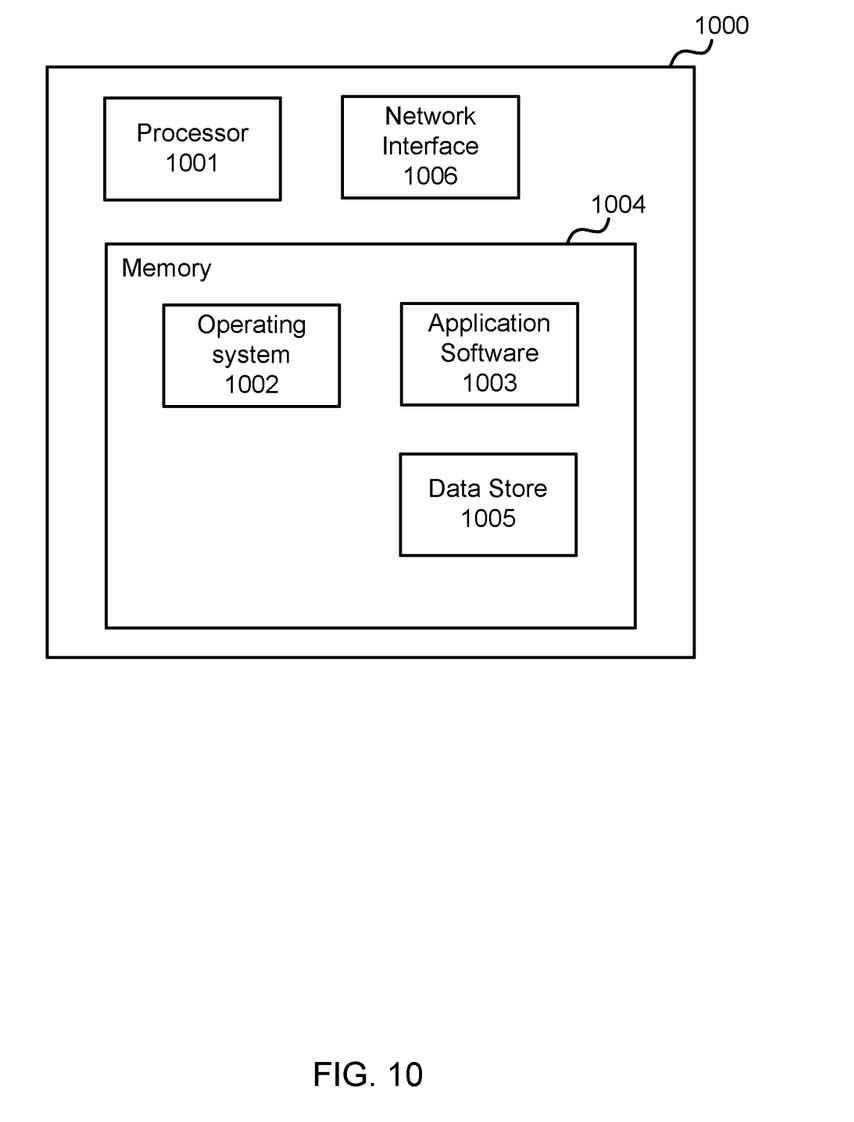
FIG. 10 illustrates various components of an exemplary web server in which embodiments of the methods described herein may be implemented.

FIG. 10 illustrates various components of an exemplary web server 1000 and in which embodiments of the methods described above may be implemented. The web server comprises one or more processors 1001 which may be microprocessors, controllers or any other suitable type of processors for processing computing executable instructions to control the operation of the device in order to perform any of the methods described herein. Platform software comprising an operating system 1002 or any other suitable platform software may be provided at the computing-based device to enable application software 1003 to be executed on the device.

The computer executable instructions may be provided using any computer-readable media, such as memory 1004. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory 1004 may also comprise a data store 1005 which may be used to store a database of user information and/or data received from other web servers.

The web server 1000 comprises a network interface 1006 and may further comprise one or more inputs which are of any suitable type for receiving media content, Internet Protocol (IP) input etc. An output may also be provided such as an audio and/or video output to a display system integral with or in communication with the web server. The display system may provide a graphical user interface, or other user interface of any suitable type.

Whilst the above examples are described with reference to an example application of online retail, the methods and system are also applicable to many other applications.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise and exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of performing an online transaction comprising:
   within a single web session:
   performing authentication of a user at a first web server;
   providing a first web page to the user from the first web server, the first web page comprising a link to a second web page provided by the second web server;
   receiving a user input at the first web server, the user input identifying a user input variable entered by the user; and
   establishing a first communication link between the first web server and the second web server and securely transmitting user data from the first web server to the second web server over the first communication link prior to completion of a transaction between the user and one or both of the first and second web servers, wherein the user data comprises the user input variable;
   and
   the method further comprising:
   establishing a second communication link between the first web server and the second web server following completion of the transaction, for secure transmission of transaction data between the web servers; and
   securely receiving transaction data at the first web server from the second web server over the second communication link.

2. A method according to claim 1, wherein the step of establishing a second communication link is performed in real time immediately following completion of the transaction.

3. A method according to claim 1, further comprising: enabling the user to concurrently and independently interact with each of the first and second web servers via a web page provided by the first web server and the second web page provided by the second web server, wherein the web page provided by the first web server is the first web page provided by the first web server or another web page provided by the first web server.

4. A method according to claim 3, wherein the web pages provided by the first and second web servers are provided within two separate frames of a browser.

5. A method according to claim 3, wherein the web page provided by the second web server is the second web page.

6. A method according to claim 1, further comprising: performing authentication of the user at the second web server.

7. A method according to claim 1, further comprising, at the first web server:
   receiving a request for the user input variable from the second web server via the first communication link; and
   transmitting a response message comprising the user input variable to the second web server via the first communication link.

8. A method according to claim 7, further comprising, at the first web server:
   verifying the request prior to transmitting the response.

9. A method according to claim 1, further comprising, at the first web server:
   pushing a message comprising the user input variable to the second web server.

10. A method according to claim 1, wherein secure transmission of user data over the first communication link uses window to window data transfer.

11. A method according to claim 10, further comprising: encrypting the window to window data transfer.

12. A method according to claim 1, further comprising: passing an identifier associated with the user from the first web server to the second web server on activation of the link to the second web page provided by the second web server.

13. A computer program embodied on a non-transitory computer readable medium comprising computer program code means which when said program is run on a computer, is adapted to:
   perform authentication of a user at a first web server;
   provide a first web page to the user from the first web server, the first web page comprising a link to a second web page provided by the second web server;
   receive a user input at the first web server, the user input identifying a user input variable entered by the user;
   establish a first communication link between the first web server and the second web server;
   securely transmit user data from the first web server to the second web server over the first communication link prior to completion of a transaction between the user and one of the first and second web servers;
   establish, at the first web server, a second communication link between the first web server and the second web server following completion of the transaction; and
   securely receive transaction data at the first web server from the second web servers over the second communication link,
   wherein the steps of performing authentication, providing a first web page and establishing a first communication link are performed within a single web session.

14. A computer program according to claim 13, wherein the step of establishing a second communication link is performed in real time following completion of the transaction.

15. A system for secure web based transactions comprising a first web server and a second web server, wherein the first web server is arranged to:
   perform authentication of a user;
   provide a first web page to the user, the first web page comprising a link to a second web page provided by the second web server;
   receive a user input at the first web server, the user input identifying a user input variable entered by the user;
   establish a first communication link between the first web server and the second web server;
   securely transmit user data from the first web server to the second web server over the first communication link prior to completion of a transaction between the user and one of the first and second web servers;

establish a second communication link between the first web server and the second web server following completion of the transaction; and securely receive transaction data at the first web server from the second web servers over the second communication link.

16. A system according to claim 15, wherein said at least one of the first and the second web servers is arranged to establish the second communication link in real time immediately following completion of the transaction.

\* \* \* \* \*